Oct. 24, 1939.　　　　L. M. SPEAR　　　　2,177,585
FASTENING DEVICE
Filed May 6, 1937
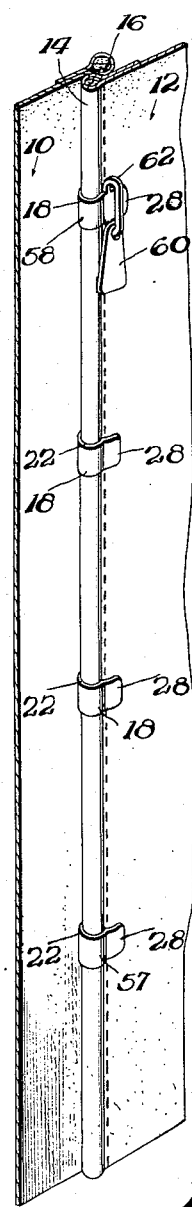
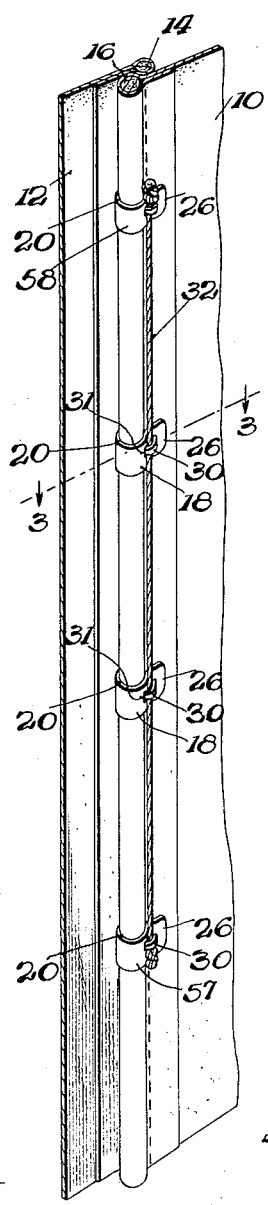
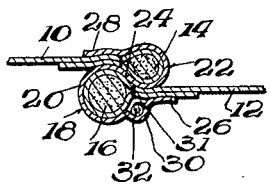
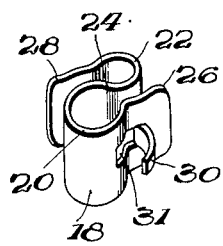
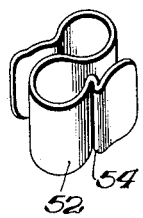
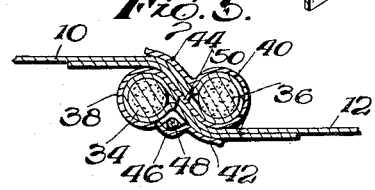
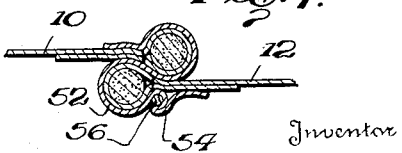
Inventor
Leonard M. Spear.
By Richard L. Underwood
Attorney Patented Oct. 24, 1939

2,177,585

UNITED STATES PATENT OFFICE 2,177,585

FASTENING DEVICE

Leonard M. Spear, Jackson Heights, N. Y., assignor to Gladys Skluth, Jackson Heights, N. Y.

Application May 6, 1937, Serial No. 141,145

3 Claims. (Cl. 24—207)

This invention relates to closure mechanism applicable to openings in flexible material and has particular reference to a slide fastener arrangement for accomplishing the desired end.

A prime desideratum of the invention is to maintain adjacent edges of flexible material in overlapped relation to one another by a series of fasteners capable of sliding movement with reference to the material, thereby permitting the edges to be spread apart when desired. With this object is view it is immaterial whether the edges of the material define an opening in a unit of material, or adjacent edges of two separate units of material are maintained in overlapped relation for closure purposes.

A further object of the invention is to accomplish the above specified end by the use of simply constructed, inexpensive, fastener elements adapted to engage flexible beads extending along the edges of the material.

Still another object of the invention is to so form the fastener elements that they are not only adapted for slidable engagement with and support by the flexible beads, but function as a guide tending to direct the material adjacent each flexible bead in such manner as to render the closure joint as flat and inconspicuous as possible.

Various other objects and meritorious features of the invention will become apparent from the following description taken in conjunction with the drawing, wherein like numerals refer to like parts throughout the several figures, and wherein:

Figure 1 is a perspective of one form of the invention, viewed from the outer side of the material;

Figure 2 is a similar perspective viewed from the under side thereof;

Figure 3 is a section along 3—3 of Figure 2;

Figure 4 is a perspective of the fastening unit illustrated in Figures 1-3;

Figure 5 is a section similar to that of Figure 3 illustrating a different form of fastener assembly;

Figure 6 is a perspective of a modified form of fastener element, and

Figure 7 is a section corresponding to that of Figure 3 showing the fastener element of Figure 6.

Referring now to the drawing, particular reference being had to Figures 1-4, the numerals 10 and 12 represent adjacent pieces of flexible material having flexible beads 16 and 14 positioned along the respective edges thereof. In the form illustrated in Figures 1-4, one bead is of somewhat less diameter than the other for a purpose to be brought out more clearly hereinafter.

A series of clips 18 are adapted for slidable engagement with supporting beads 14 and 16. These clips, or slide fasteners, are so constructed and associated with the beads as to maintain them, and as a consequence the material with which each is associated, in overlapped relation to thereby form a complete closure.

Each clip comprises dual gripping portions 20 and 22 in spaced offset relation to one another. Each clip is preferably integral in structure and the two gripping portions are integrated by means of a common central portion 24. The respective gripping portions of each clip are of reverse curvature as clearly indicated in the drawing, thereby forming what may generally be regarded as an S-shaped unit.

The outer extremity of each gripping portion is extended as indicated at 26 and 28 to form guides cooperating with the material adjacent each bead to hold it snugly against the central portion of the clip and assist to direct it in planes substantially parallel to one another. This arrangement assists materially in flattening the line of joinder and providing a neat closure assembly. Each extended portion may be curved slightly toward the central portion of the clip, as illustrated in the drawing.

A tab 30 may be struck up from the wall of one side of the clip, preferably from a point within an extended portion thereof, to form a slot 31 extending over into the adjacent arcuate gripping portion. That wall of the clip from which the tab is struck constitutes the under side of the clip and a flexible spacer element 32 is secured at spaced intervals along its length to each clip by means of such tab. The tab is forced down upon the spacer element, thereby gripping it between itself and the outer wall of the clip. By reason of the particular manner in which the tab is struck from the clip the end of the tab may be forced down into the end of slot 31, as clearly indicated in Figure 3, to thereby lock the same. The spring tension of a tab struck from a metal clip materially assists in retaining the tab in locked position.

By reason of the fact that bead 14 is smaller than bead 16, there is a tendency for the smaller bead to nestle down alongside the wall of the larger bead, thereby substantially reducing the offset between the two pieces of material associated with the respective beads and flattening out the closure assembly.

A somewhat modified arrangement, although essentially the same insofar as all important features hitherto discussed are concerned, is illustrated in Figure 5, wherein beads 34 and 36 are of substantially the same size but a minimum offset between the edges of the material associated with them is obtained. The clip illustrated herein is provided with dual gripping portions 38 and 40, extended portions 42 and 44, and locking tab 46 adapted to clamp spacer element 48 against the wall of the clip. The difference resides in the fact that the central integrating portion 50 of this clip is sufficiently extended in length to space the beads laterally away from one another as clearly illustrated in this figure.

This feature permits a greater overlap in the material when the opening is closed and this in turn permits the beads to lie in an intermediate plane substantially parallel to and closely adjacent the two pieces of material. It is therefore apparent that the objective of this structure is substantially the same as that wherein the beads are of different sizes, and it is believed that the structure illustrated in Figure 5 is perhaps the most satisfactory for obtaining the objective. The complete closure by means of overlapping the material and a flattening of the material insofar as possible across the closure mechanism are features of great importance.

A still further modified form of clip is illustrated in Figures 6 and 7, the only difference residing in the manner in which the under wall of the clip is arranged to clamp the spacer element. In this form the outer wall of that gripping portion 52 constituting the under section of the unit is crimped as at 54 to clamp spacer element 56 therein. In all other respect this form may be the same as either of the other two forms hitherto described.

As will be obvious from the description herein, a slide fastener closure mechanism of the type illustrated may be used not only in conjunction with bags of flexible material, openings formed in flat material such as shirts, etc., but may be provided as a unit like that illustrated in Figures 1 and 2 for insertion in any type of material. Such inserts may be made up with materials of different colors, etc., so that they may be purchased and inserted in dresses, etc., to take the place of the customary hook and eye or snap assemblies used for closure purposes.

For most purposes it is preferable that one end clip of the series, such as 57 in the form illustrated, be securely anchored to the wall with which it is associated, the other end clip 58 having associated therewith some sort of mechanism to facilitate manually sliding the clips. In the form illustrated a tab 60 is pivotally connected to a loop 62 associated in any desired way with the clip. The end clip 58 may be drawn toward the anchored clip and as its sliding movement progresses will force the other clips up against the anchor clip. From this position movement of the end clip 58 toward closed position will operate through spacer element 32 to draw the other clips into closing position, the slidable movement thereof being limited to full extension of the spacer element from the anchored clip 57.

A further important feature of the invention which is generic to all of the modifications disclosed, but particularly effective and efficient for performing its intended function in the structure illustrated in Figure 5, resides in the fact that the flexible spacer element is secured to each clip at a point adjacent the outer extremity of an arcuate gripping portion. Due to the spaced offset arrangement of the two bead-gripping portions of each clip, a line drawn approximately through the outer ends of the two arcuate gripping portion passes between the beads. In other words, the outer termination of each arcuate gripping portion is disposed at approximately the center of the central integrating portions 24 and 50. This structural arrangement centralizes the pull of the flexible spacer element on each clip as the same is drawn along the beads which function as a track.

As clearly illustrated in Figure 1, the loop 62 to which tab 60 is attached is associated with the clip in the same manner, i. e., at substantially the intersection of the outer arcuate gripping portion 22 with its adjacent extended guide portion 28. The pull exerted on the control clip 58 by manual manipulation thereof is therefore exerted centrally of the bead and clip assembly. This arrangement eliminates any tendency for the clips to bind when sliding the same along their supporting beads during opening or closing movement.

While throughout the specification and claims the term "arcuate" has been used to describe the contour of the gripping portions of the clip, it should be understood that this term is intended to embrace structures wherein the contour of each gripping portion is "generally arcuate," and not necessarily a continuous curve. It is obvious that a series of straight portions enclosing successive wide angles might be used in lieu of continuous curves to form substantially the same structure for performing precisely the same functions.

Having illustrated and described certain preferred forms of my improved closure mechanism, various other modifications will be apparent to those skilled in the art and for that reason I wish to limit myself only within the scope of the appended claims.

What I claim is:

1. A closure for an article having an opening with flexible beads extending along the edges thereof comprising a series of clips each including laterally offset arcuate gripping portions of reverse curvature opening substantially towards one another to embrace said beads and force the same, and the material immediately adjacent thereto, into overlapped relation and maintain the beads in nested relationship when the opening is closed, a crimp in the wall of one gripping portion of each clip at a point substantially centrally disposed with reference to said gripping portions, and a flexible spacer member secured by said crimp at spaced points along its length.

2. A closure for an article having an opening with flexible beads extending along the edges thereof comprising a series of clips having adjacent generally arcuate gripping portions of reverse curvature joined by a central integrating portion, the outer side of each gripping portion terminating at a point substantially central with reference to the central integrating portion, a tab struck from the wall of one gripping portion of each clip adjacent the end thereof, and a flexible spacer member gripped at spaced points along its length by said tabs whereby the spacer element is substantially centrally disposed with reference to the gripping portions of each clip.

3. A closure for an article having an opening with flexible beads extending along the edges thereof comprising a series of clips having adjacent generally arcuate gripping portions of reverse curvature joined by a central integrating portion, the outer side of each gripping portion terminating at a point substantially central with reference to the central integrating portion, a flexible spacer element secured at spaced points along its length to the respective clips at substantially the terminal points of gripping portions lying on one side of a plane including the longitudinal axes of the beads and passing through the centers of both gripping portions, and a pull tab secured to an end clip on the side of said plane opposite the spacer element and at substantially the terminal point of a gripping portion whereby the spacer element and the pull tab are disposed between the overlapped beads on opposite sides thereof to centralize the pull when sliding the clips along the beads.

LEONARD M. SPEAR.